Patented Feb. 24, 1925.

1,527,614

UNITED STATES PATENT OFFICE.

TUNIS DICKERSON TIETIG OF WASHINGTON, DISTRICT OF COLUMBIA.

COMPOSITION AND METHOD FOR GENERATING CHLORINE.

No Drawing.  Application filed May 29, 1924. Serial No. 716,828.

*To all whom it may concern:*

Be it known that I, TUNIS DICKERSON TIETIG, a citizen of the United States, and a resident of Washington, District of Columbia, have invented certain new and useful Improvements in Compositions and Methods for Generating Chlorine, of which the following is a specification.

My invention relates to a composition, which is a dry powder, which when moistened with water will react in such a manner as to produce chlorine gas. The composition consists of an intimate mixture of a metallic hypochlorite, such as sodium hypochlorite or calcium hypochlorite (chloride of lime) and an oxidizing agent, which has also the properties of an acid. A suitable substance of this character is chromic anhydride ($CrO_3$). The substance is mixed dry with the hypochlorite in such proportions as to be at least sufficient to combine completely with the base of the hypochlorite and also to oxidize the hypochlorous acid split off by the reaction which takes place after moistening.

It is, of course, important that the chemicals be kept dry before use. The composition has a particular value in therapeutics in that it offers a convenient way of generating chlorine for the treatment of colds. For this and other purposes, it is convenient to place the composition in a laboratory gas generator and allow water to drop on it but special apparatus is not necessary. Moderate heat, of course, assists the reaction, but it will take place at ordinary temperatures.

Having now described my invention, what I claim is:

1. A chlorine generating composition consisting of a hypochlorite and a red, crystalline anhyride of chromic acid.

2. The method of generating chlorine which consists in reacting a hypochlorite with chromic anhydride.

3. The method of generating chlorine which consists in reacting free hypochlorous acid with chromic anhydride.

TUNIS DICKERSON TIETIG.